Aug. 12, 1941.　　　　E. NÖTHE　　　　2,252,330
INDICATING COUNTER FOR FIREARMS
Filed July 21, 1939
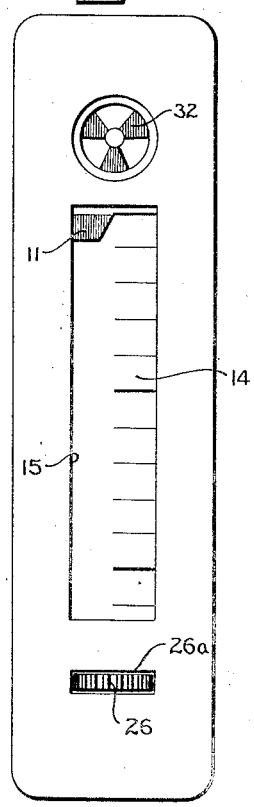
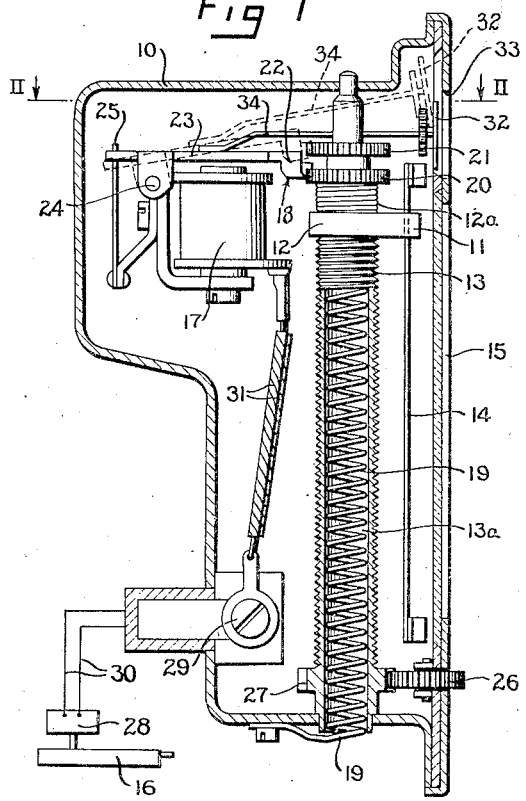
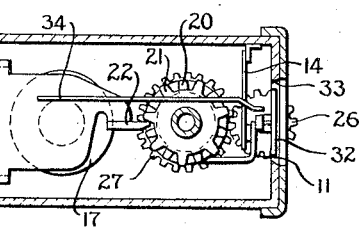
INVENTOR.
Erich Nöthe
BY
Stephen Cerstvik
ATTORNEY.

Patented Aug. 12, 1941

2,252,330

UNITED STATES PATENT OFFICE 2,252,330

INDICATING COUNTER FOR FIREARMS

Erich Nöthe, Berlin-Spandau, Germany, assignor to Siemens Apparate Und Maschinen Gesellschaft mit beschrankter Haftung, Berlin, Germany, a corporation of Germany Application July 21, 1939, Serial No. 285,812
In Germany January 1, 1938

6 Claims. (Cl. 235—124)

This invention relates to indicating means, and more particularly to means for indicating the number of rounds of ammunition fired from or available to a gun.

One of the objects of the present invention is to provide means for indicating to a gunner, located at a point remote from a gun, the amount of ammunition available to the gun.

Another object of the invention is to provide a novel indicator of the above character which is small in size, light in weight, and therefore especially adapted for use aboard aircraft.

A further object is to provide an electrically actuable indicator of the above character which requires only a low voltage.

The above and further objects and novel features will more fully appear from the detailed description when the same is read in connection with the accompanying drawing. It is to be expressly understood, however, that the drawing is for purposes of illustration only and is not intended as a definition of the limits of the invention, reference for the latter purpose being had to the appended claims.

In the drawing, wherein like reference characters refer to like parts throughout the several views—

Fig. 1 is a side elevation partly in section of one embodiment of the invention;

Fig. 2 is a sectional view taken on line II—II of Fig. 1; and

Fig. 3 is a front elevation of the structure shown in Fig. 1.

The form of the invention illustrated in the accompanying drawing, by way of example, comprises an indicating device which is especially adapted for indicating at a point remote from a gun the amount of ammunition which is available to or has been fired from the gun, and is constituted by an indicating pointer which moves over a suitable scale and which is attached to a traveling nut, the latter engaging a threaded screw. Means are provided in which potential energy may be stored for normally urging the screw to rotate in one direction, and an escapement mechanism is operatively connected to the screw, which mechanism is controlled by means which operate in response to each firing of the gun.

As shown in Fig. 1 the novel apparatus is constituted by a housing 10 having indicator means therein comprising a pointer 11 which is secured to a traveling nut 12, the latter engaging a threaded spindle or lead screw 13 having a bore 13a therein, and being adapted for axial movement upon the screw. Yielding means are provided for urging the nut axially from an unthreaded portion of the spindle, as shown in Fig. 1, towards the threaded portion comprising a coil spring 12a which surrounds spindle 13 and is interposed between the nut 12 and a toothed wheel to later appear. A suitable scale 14 is provided for the pointer which can be read through a window 15 in the housing 10. The scale can be calibrated, for example, in the embodiment shown in accordance with the number of rounds of ammunition fired from or available to a gun 16 which can be located at some remote point relative to the indicator, the gun being connected to the indicator in a manner to appear later.

Means are provided for governing the indicator comprising a step-by-step control arrangement which in the form shown is constituted by an electro-magnet 17 and an escapement mechanism 18. This arrangement controls the movement of the spindle 13 which is normally urged to rotate in a predetermined direction by suitable mechanical means in which potential energy may be stored, for example, a spiral spring 19 which is disposed within bore 13a and attached at one extremity thereof to the spindle 13 and at the other extremity to the housing 10.

The above potential energy means are employed in order that the indicating device can be as compact and light as possible and also in order that it can be controlled by electrically actuable means which require current at a low voltage, i. e., the electro-magnet 17 and the escapement mechanism.

The escapement mechanism, in the form shown, comprises toothed escapement wheels 20, 21 which are mounted upon the spindle in such a manner that the teeth of one wheel are staggered relative to those of the other wheel by an angular amount substantially equal to the width of one tooth. A pawl finger 22 which is adapted for successively engaging the teeth of each wheel is provided which is mounted upon an armature 23 which in turn is pivotally mounted at 24 adjacent electro-magnet 17, and is normally urged in a counter-clockwise direction by a leaf spring 25.

Manually operable means are provided for winding spring 19 and placing the indicator in an initial or zero position comprising a gear 26 which is preferably mounted adjacent the lower extremity of spindle 13 and which engages a gear 27 secured to the spindle. A portion of gear 26 extends through an aperture 26a in the housing 10 and can be moved by hand.

The gun 16, which for example may be located in the wing of an aircraft, is operatively connected to the indicator, located for example on the instrument panel of the craft, by means of an intermittently operable electric switch 28 which is preferably actuated by the bolt or lock (not shown) of the gun when in the "ready" or rear position. Switch 28 is connected to a socket 29 within the housing by means of leads 30, the socket being connected to the electro-magnet by leads 31.

A disc indicator 32 which is visible through a window 33 in the housing face is attached to the armature 23 by means of a bar 34. The disc provides an indication of the energized or deenergized condition of the armature 17, the disc being visible in the energized condition and not visible or only partially visible as shown in dotted lines in Figure 1 in the deenergized condition. The position of the disc thus makes known to the gunner whether or not the gun is in a "ready" position for firing or whether, for example, it is jammed.

In operation, the spindle 13 is rotated by gear 26 in order to wind the spring 19 and to place the pointer 11 in an initial position at one extremity of the scale 14. When the gun starts firing a current impulse is fed to the electromagnet 17 each time the bolt or lock of the gun reaches a predetermined position, e. g., a rear dead center position. This impulse attracts the armature 23 with the result that the pawl 22 is pulled from a tooth gap of the escapement wheel 21 into an obliquely disposed tooth gap of wheel 20, the latter having moved an angular amount equal to the angular difference of said gap, the movement being produced by spring 19. A further rotation of the spindle occurs when the electro-magnet becomes deenergized and the armature 23 is moved back into engagement with wheel 21 under the action of leaf spring 25. With the rotation of the spindle, the pointer 11 thus progressively advances along the scale 14 in response to the number of rounds of ammunition fired.

There is thus provided novel means for indicating the number of shots fired from or available to a gun. The apparatus is small, compact, inexpensive to manufacture, and adapted for being controlled by electric means which require only a low voltage. The indicator, moreover, is accurate, dependable and quickly readable.

Although only one embodiment of the present invention has been illustrated and described in detail, it is to be expressly understood that the invention is not limited thereto. For example, instead of operatively interconnecting the gun and the indicator by electrically operable means, it is possible to mechanically interconnect them. Further, the novel indicator is not restricted to use with a gun but may be employed for indicating any quantity which changes in response to intermittent impulses. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. The combination with a pointer, of a spindle having a threaded portion and an unthreaded portion, a traveling nut for the spindle initially disposed above the threaded portion, yieldable means mounted on said spindle about the unthreaded portion thereof for urging said travelling nut toward the threaded portion, the pointer being mounted on the nut, a scale for the pointer, the scale being mounted upon a housing, intermittently operable escapement mechanism operatively connected to said spindle, and a spring coaxial with the spindle and coupled thereto, the spring also being attached to the housing.

2. In apparatus of the class described, a lead screw, a nut upon said screw, a pointer attached to the nut, an escapement mechanism for said screw comprising a first escapement gear secured to said screw, a second escapement gear coaxial with the first gear and secured to said screw, the teeth of the two gears being angularly displaced relative to one another by a predetermined amount, and a pivotally mounted pawl adapted for movement from one gear to the other, and means for oscillating said pawl.

3. In apparatus of the class described, a spindle having a bore therein, a traveling nut engaging the spindle, a pointer attached to said nut, escapement means operatively connected to the spindle for controlling movement of the spindle, means for actuating the last named means, yieldable means mounted within said bore and adapted for moving said spindle and manually operative means for tensioning said yieldable means.

4. In apparatus of the class described, a lead screw having a bore therein, a nut engaging said screw, a pointer secured to said nut, a scale for said pointer, escapement means operatively connected to said screw for controlling movement of said screw in predetermined angular increments, yieldable means mounted within said bore for moving said lead screw, and manually movable means for rotating said screw to an initial position, said yieldable means being placed in a constrained condition when said manually movable means moves the screw to said initial position.

5. In apparatus of the class described, a housing, a spindle mounted for rotatable movement within said housing, an index operatively associated with the spindle, energy storing means comprising a coiled member operatively connected with said spindle for rotating the spindle, escapement means for controlling the amount of rotation of said spindle, manually operative means for energizing said energy storing means and moving said index to an initial position, and a scale exposed by said housing, said index moving adjacent said scale during rotation of said spindle.

6. In apparatus of the class described, a housing, a spindle having a hollow bore mounted for rotatable movement within said housing, an index carried by said spindle for axial movement thereon, a coiled spring within said spindle bore for rotating the spindle, escapement mechanism for controlling the amount of rotation of said spindle, manually operative means for rotating said spindle and tensioning said coiled spring whereby said index is moved to an initial position, and a scale carried by said housing, said index moving adjacent said scale during rotation of said spindle.

ERICH NÖTHE.